Aug. 2, 1938.   W. H. MARTIN   2,125,513
FLUID PRESSURE INDEXING VALVE
Filed Aug. 20, 1936   2 Sheets-Sheet 1

Inventor
William H. Martin

Aug. 2, 1938.   W. H. MARTIN   2,125,513
FLUID PRESSURE INDEXING VALVE
Filed Aug. 20, 1936   2 Sheets-Sheet 2

Inventor
William H. Martin
By Faust V. Crampton
Attorney

Patented Aug. 2, 1938

2,125,513

UNITED STATES PATENT OFFICE 2,125,513

FLUID PRESSURE INDEXING VALVE

William H. Martin, Detroit, Mich.

Application August 20, 1936, Serial No. 97,007

12 Claims. (Cl. 60—54.5)

My invention has for its object to provide an automatic indexing valve for causing by fluid pressures sequential or periodic operations of elements or devices or parts of apparatuses or machines controlled by the elements.

Thus, by my invention, a plurality of welders for welding parts together may be suitably mounted and sequentially operated. Similarly the invention may be used to produce sequential stamping of a large number of parts or sequential riveting of a plurality of parts or the sequential or timed operations of a machine or the simultaneous operations of groups of controlled devices.

The invention may be contained in structures of different forms and used for a great variety of purposes. To illustrate a practical application of the invention, I have selected an indexing valve as an example of the various structures that contain the invention and shall describe the structure selected hereinafter. The indexing valve is illustrated in the accompanying drawings.

Figure 1:
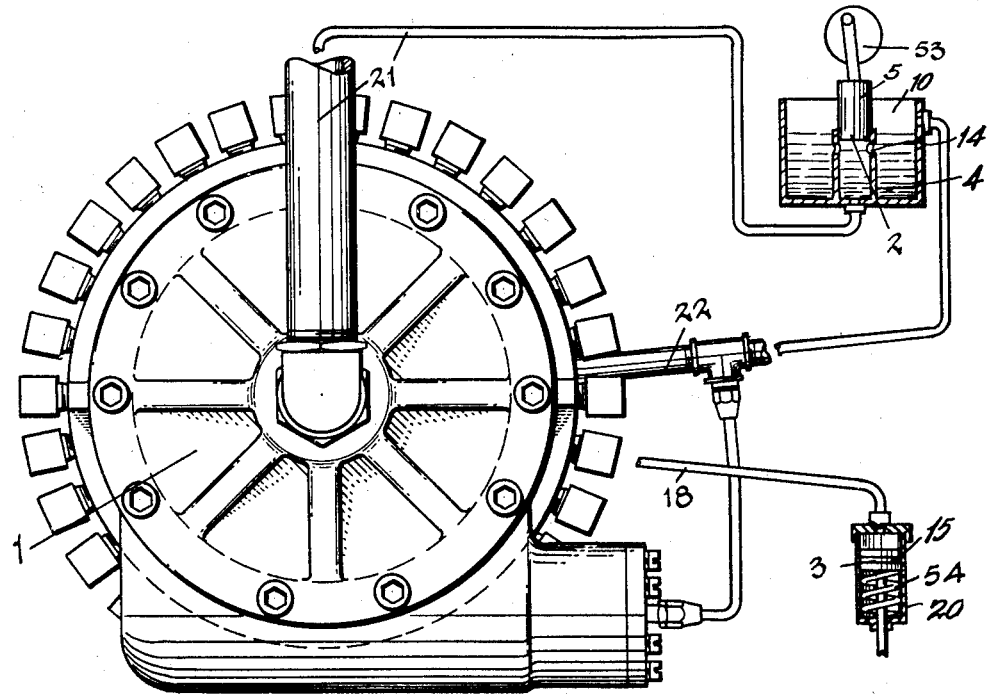
Fig. 1 illustrates a top view of the indexing valve and indicates diagrammatically its connection in an apparatus having parts that are sequentially operated by a fluid pressure means.
Figure 2:
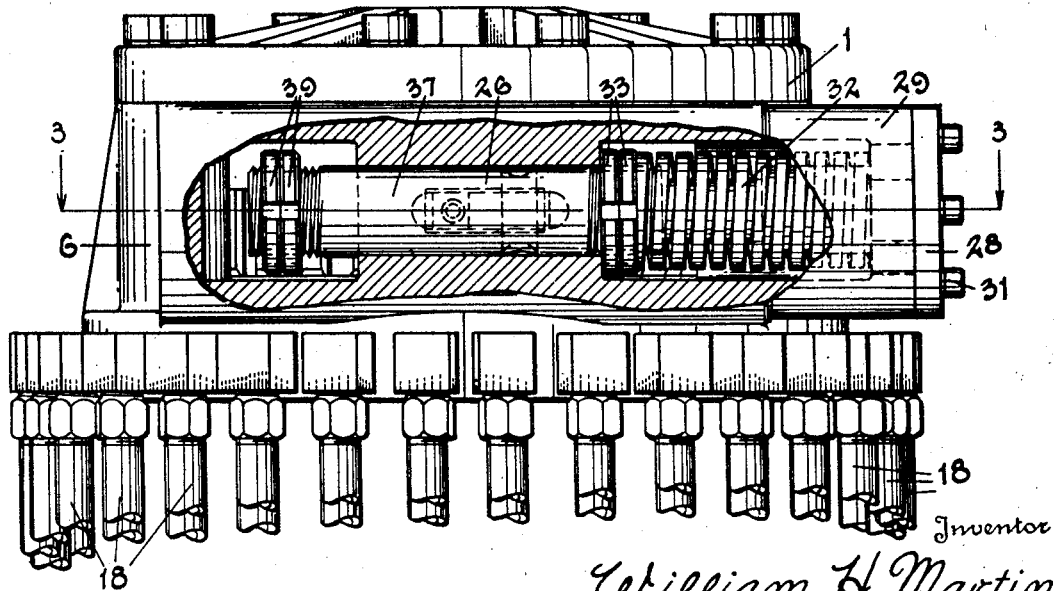
Fig. 2 is a side view of the valve shown in Fig. 1.
Figure 3:
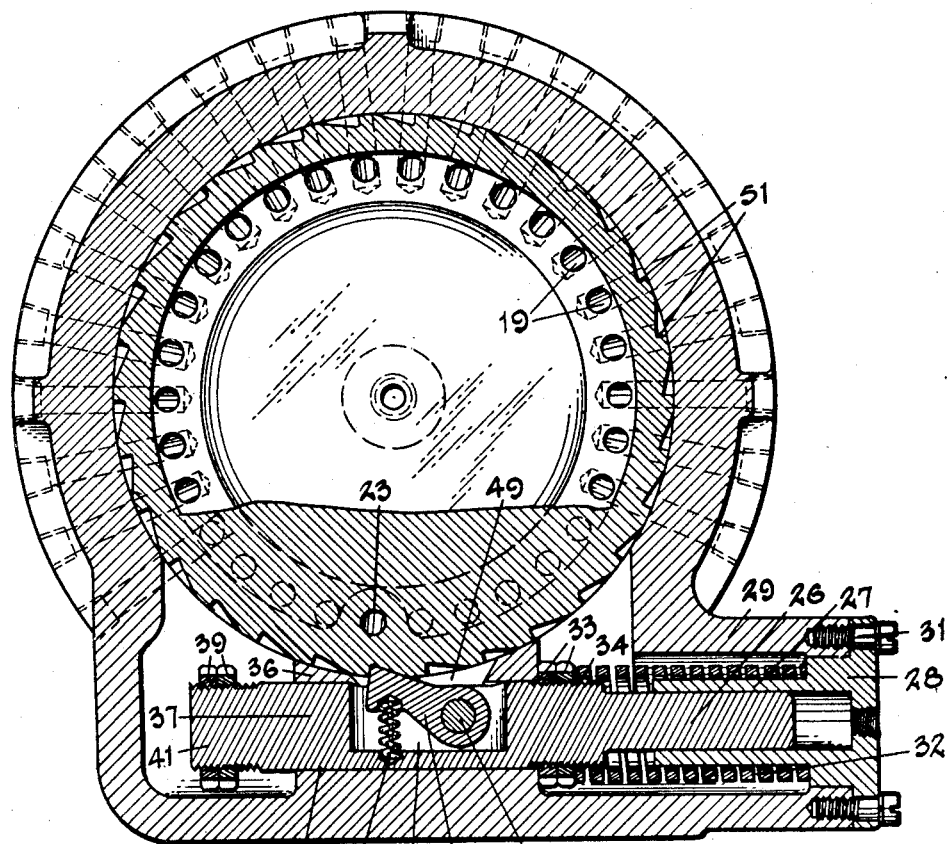
Fig. 3 is a view of a section of the valve taken on the plane of the line 3—3 indicated in Fig. 2.
Figure 4:
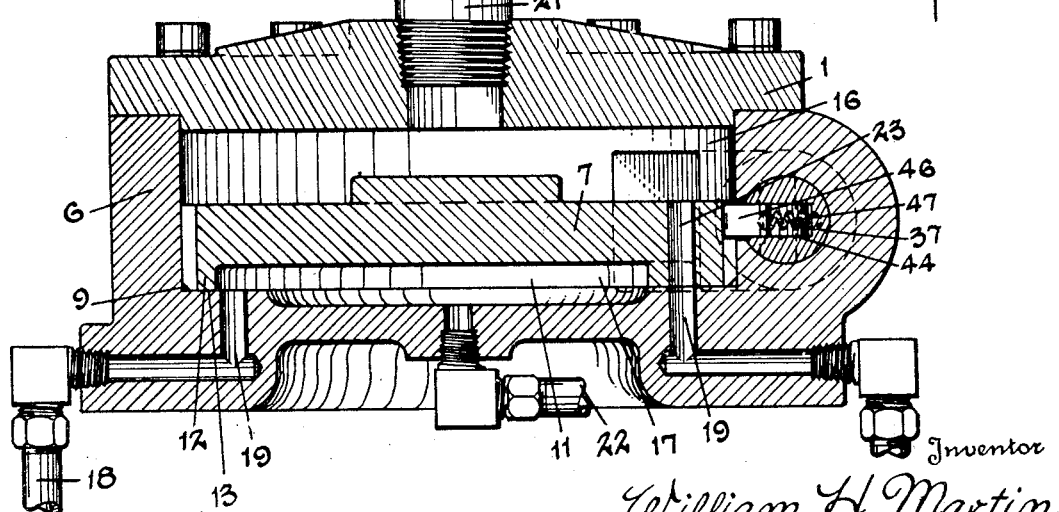
Fig. 4 is a view of a vertical section of the valve.

The valve 1 is automatically operated by a fluid pressure means 2 to connect the pressure means to the pressure devices 3 and produce operations of one or more of the pressure devices upon rise in pressure of the pressure means. Preferably, oil is used as the pressure medium. It fills the interconnecting passageways that lead from the pulsating pressure means 2 to the valve 1 and from the valve to the pressure devices 3. The pressures produce periodic flow of small quantities of the oil from the pressure means 2 to the valve 1 and from the valve 1 to one or more of the pressure devices 3. Upon reduction of the pressure of the pressure means 2, oil is returned to the valve and the pressure means by the return movement of the just previously operated pressure device or devices. If desired, means may be provided for controlling the length of the high or rising pressure periods or the intermediate low or reducing pressure periods. Also operations of the pressure devices responsive to the pressure means may be separated by one or more periods of high pressure produced by the pressure means.

The moving parts of the valve 1 are enclosed in a shell 6. The walls of the shell have openings and passageways that communicate with the pressure means 2 and the pressure devices 3.

A rotatable disc 7 having a diameter substantially the same as the diameter of the interior surface of the side wall of the shell 6 is located upon a raised bearing surface 9 formed on the bottom of the shell. The underside of the disc 7 is provided with a circular recess 11 forming a peripherally disposed flange part or rim 12 having a bearing surface 13 that is located on the bearing surface 9. The contacting surfaces of the disc and the bottom are preferably ground to produce substantially an oil seal between the chambers 16 and 17 formed by the disc within the shell.

Each of the pressure devices is connected by means of a pipe 18 with a passageway 19 extending through the wall of the shell 6 and communicating with the chamber 17. The openings 19 are located in the raised bearing surface 9 and within the inner perimeter of the annular rim 12. The pressure means 2 is connected to the chamber 16 of the valve by means of the pipe 21 through which its actuating pressure is transmitted to the valve. The chamber 17 is connected with the pressure means 2 by means of a pipe 22 to return the oil to the pressure means. The pipes 21 and 22 are preferably centrally connected to the top and bottom walls of the valve. The disc 7 is provided with an opening 23 located in a boss extending inwardly from the annular rim 12 and so as to be located in registering relation with the passageways 19 in succession upon rotative movement of the disc. Thus, when the opening 23 registers with any one of the openings 19, the rise in pressure of the pressure means 2 is transmitted through the oil located in the pipe 21, the chamber 16, the opening 19, and the pipe 18 to the particular pressure device 3 with which the connection is established and causes the pressure device 3 to perform its particular function by the pressure that is transmitted to it. Thus, the pressure devices may be sequentially operated, or may be operated in any desired order or in groups according to the control element or a step by step mechanism that may be used in rotating the disc and according to the connections between the pressure devices and the indexing valve.

In the form of construction shown, the disc 7 is moved step by step to produce registration of the opening 23 with the passageways 19 in succession and corresponding sequential operations of the pressure devices 3. A piston 26 is slidably supported in a cylinder 27 located in the valve. The cylinder 27 may be provided with a flanged head 28 that fits within a boss 29 tangentially protruding from the cylindrical side wall of the shell 6 to locate the axis of the piston parallel and in proximity to a line tangential to the disc 7. The cylinder 27 is secured to the shell 6 by means of the screws 31 that extend through the flange part of the head 28 and into the boss 29. The exterior diameter of the cylinder 27 is considerably less than the interior diameter of the boss 29 which forms a recess in which is located a spring 32. The spring 32 is located intermediate the head 28 of the cylinder 27 and a pair of adjustable lock nuts 33 located on one end of an enlarged part 34 of the piston 26. The spring 32 is a compression spring and operates to resiliently return the piston 26 when it is forced outwardly by the hydraulic pressure produced in the chamber 16 of the valve 1 by the pressure means 2. The piston is guided in its movements not only by the cylinder 27, but also by an inwardly projecting boss 36 through which the piston extends.

Lock nuts 39 are threaded on to an end portion 41 of the piston and on the side of the boss 36 opposite to that on which the lock nuts 33 are located. Thus, the lock nuts 33 and 39 may be adjustably located with reference to the boss 36 to adjust the extent of the stroke that may be made by the piston, both as to its outward movement relative to the disc 7 and the shell produced by the hydraulic pressure and also as to its inward return movement produced by the pressure of the spring 32.

The enlarged part 37 of the piston 26 is provided with a recess 44 in which is located a dog 46 that is spring pressed by means of the spring 47 located intermediate the bottom of the recess 44 and the nose of the dog 46. The dog 46 is pivotally supported by the pin 48 and is pressed towards the periphery of the disc 7. It extends through a slot 49 formed in the boss 36 and prevents rotation of the piston about its axis.

The disc 7 is provided with a plurality of ratchet teeth 51 spaced about the axes of the disc the same angular distance that the openings 19 are spaced from each other. The stroke of the piston 26 is adjusted by the lock nuts 33 and 39 to produce engagement of a tooth 51 by the dog 46 upon each succeeding return movement of the piston. Preferably the angular movement of the disc 7 produced by the piston is such as to cause registration of the opening 23 with the openings 19 sequentially to produce sequential operation of the pressure devices 3.

The cylinder 27 may be connected at its outer end with the return pipe 22 to draw from the cylinder any oil that may pass the piston during its operation.

In the operation of the indexing valve, the pressure means 2 which is constructed to produce pulsating pressure in the oil filled passageways of the apparatus may comprise a single cylinder pump having a cylinder 4 and a reciprocable piston 5. The cylinder 4 receives oil from the reservoir 10 through an opening 14 when uncovered by the piston 5. The piston 5 may be operated by any suitable motor or other actuating means 53. Each pulsation will cause operation of the pressure device 3 having a piston 15 and a cylinder 20 to which connection is established through the openings 23 and 19 and also an outward movement of the piston 26. Upon reduction of the pressure, the piston 26 which has been outwardly pressed during the pressure period is moved inward by the pressure of the spring 32. The dog having engaged a sequentially disposed tooth 51 moves the disc 7 a short distance upon its return movement. The disc 7 first operates to establish return connection for the oil from the pressure device 3 to the chamber 17 and through the pipe 22 to the pressure means 2. This releases the pressure in the pressure device. The piston 15 of the pressure device is pressed outward by the spring 54 and when the oil pressure is reduced, the spring 54 of the pressure device 3 causes the return of the piston of the pressure device and discharge of the oil from its cylinder which causes a return movement of the oil along the pipes 18 and 22. Upon the completion of the return stroke of the piston 26, the opening 23 is brought into registration with another of the openings 19 which establishes connection between the pressure means 2 and another of the pressure devices 3.

Upon production of succeeding changes in pressure, the pressure devices are sequentially connected and operated to produce riveting or welding or timed operations of a machine or apparatus or other functions for which they may be designed or peculiarly constructed.

I claim:

1. In a fluid pressure indexing valve having two chambers, a plurality of pressure devices connected to one chamber, a pulsating pressure means connected to the other chamber, a movable member having a passageway for selectively closing the connection of each pressure device with the said one chamber and connecting it with the said other chamber to produce operation of the pressure devices at least one at a time by the pulsating pressure of the pressure means.

2. A fluid pressure indexing valve having a pair of chambers, a plurality of pressure devices connected to one of the chambers, a pressure means connected to the other of the said chambers for producing pressure in the said other chamber and to the said one chamber for withdrawing fluid from the said one chamber, a movable member for connecting the pressure devices with the said other chamber for operating the pressure devices and subsequently restoring the connections of the pressure devices with the said one chamber for returning the fluid to the said pressure means.

3. A fluid pressure indexing valve having a pair of chambers, a plurality of pressure devices connected to one of the chambers, a pressure means connected to the other of the said chambers for producing pressure in the said other chamber and to the said one chamber for withdrawing oil from the said one chamber, a movable member for connecting the pressure devices with the said other chamber for operating the pressure devices, means operated by the pressure means for actuating the movable members and subsequently restoring the connections of the pressure devices with the said one chamber for returning the fluid to the said pressure means.

4. In a fluid pressure indexing valve, a movable member forming two chambers within the valve, a plurality of pressure devices connected to one of the said chambers and a pulsating pressure means connected to the other of the said chambers for producing pulsating pressures in the said other chamber, the movable member having a passageway for connecting the connections of the pressure devices with the said other chamber in succession for sequentially operating the pressure devices by the pulsating pressures produced by the pressure means.

5. In a fluid pressure indexing valve, the valve having a movable member forming two chambers, a plurality of pressure devices connected to one chamber, a pressure means connected to the other chamber, means for operating the pressure means to produce a pulsating pressure, a resilient means operated by the pressure means for moving the member during low pressure periods to connect the said connections of the pressure devices with the said other chamber in succession and produce operation of the pressure devices by the pulsating pressures sequentially during high pressure periods of the pulsating means.

6. In a fluid pressure indexing valve, a movable member forming two chambers within the valve, a plurality of pressure devices connected to one of the said chambers and a pulsating pressure means connected to the other of the said chambers for producing pulsating pressures in the said other chamber, the movable valve member having a passageway for connecting the pressure devices with the said other chamber in succession for sequentially operating the pressure devices by the pulsating pressures produced by the pressure means, and means operated by the said pressure means for actuating the movable member.

7. In a fluid pressure apparatus, a plurality of pressure devices, a fluid pressure means for producing changes in fluid pressure, and a resilient means operated by the pressure means during high pressure periods and operative to connect the pressure devices in succession with the pressure means during the low pressure periods to sequentially operate the pressure devices by the pressure means during the high pressure periods following each low pressure period.

8. In a fluid pressure apparatus, a plurality of pressure devices, a fluid pressure means for producing pressure pulsations in the fluid, and means operative during low pressure periods for connecting the pressure devices to the pressure means to sequentially operate the pressure devices during succeeding high pressure periods and to connect the precedingly operated pressure devices with the pressure means for the return of the fluid from the pressure devices to the pressure means.

9. A fluid pressure indexing valve having a pair of chambers, a plurality of pressure devices connected to and having means for returning fluid to one of the chambers, a pressure means connected to the other of the said chambers for producing pressure in the said other chamber and to the said one chamber for receiving fluid from the said one chamber, and a movable member operated by the pressure means for connecting the pressure devices with the said other chamber to operate the pressure devices and to subsequently and sequentially connect the precedingly operated pressure device with the said one chamber for returning the fluid to the pressure means.

10. In a fluid pressure apparatus, a plurality of pressure devices, a fluid pressure means for producing alternately high and low fluid pressures, and means operated by the pressure means for connecting the pressure devices with the pressure means during the low pressure periods to sequentially operate the pressure devices during the succeeding high pressure periods and to connect the pressure devices with the pressure means during the low pressure periods to return the fluid from the pressure devices in the low pressure periods to the pressure means.

11. In a fluid pressure apparatus, a plurality of pressure devices, a cylinder and piston, a reservoir for liquid communicating with one end of the cylinder, means for reciprocating the piston, the cylinder having a passageway opened by the piston upon the completion of its non-working stroke and closed upon the initiation of its working stroke, an indexing valve having two chambers, the reservoir and a plurality of pressure devices connected to one chamber and the cylinder connected to the other chamber, and a movable member having a passageway for disconnecting the pressure device with said one chamber in succession and connecting them with the said other chamber to produce operation of the pressure devices in succession during the high pressure periods produced by the piston and for connecting the precedingly operated pressure device with the said one chamber to return the fluid to the reservoir through the said one chamber during the period following the operation of the pressure device by the pressure produced by the piston.

12. In a fluid pressure apparatus, a plurality of pressure operated devices, a fluid pressure producing means for producing changes in fluid pressure, a fluid pressure operated means operated by the fluid pressure produced by the pressure producing means during high pressure periods, and means coacting with the pressure operated means for connecting the pressure operated devices in succession with the pressure producing means during the low pressure periods to sequentially operate the pressure operated devices by the pressure producing means during the high pressure periods following each low pressure period.

WILLIAM H. MARTIN.